Figure 1:
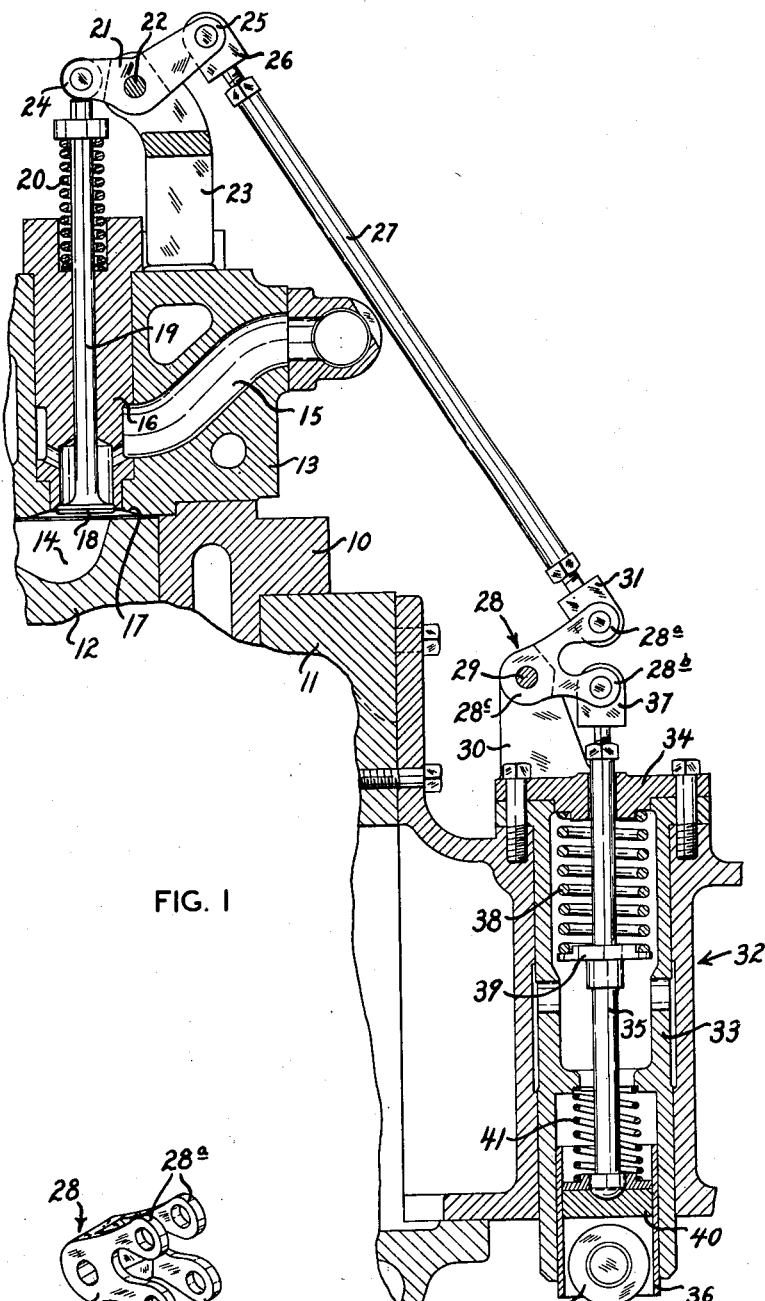

March 17, 1953  C. H. SCHOWALTER  2,631,576
VALVE OPERATING MECHANISM
Filed May 12, 1947

INVENTOR
CLARENCE H. SCHOWALTER
BY Paul L. Kisken
ATTORNEY

Patented Mar. 17, 1953

2,631,576

UNITED STATES PATENT OFFICE 2,631,576

VALVE OPERATING MECHANISM

Clarence H. Schowalter, Beloit, Wis., assignor to Fairbanks, Morse & Co., Chicago, Ill., a corporation of Illinois Application May 12, 1947, Serial No. 747,563

2 Claims. (Cl. 123—90)

This invention relates to valve operating means for internal combustion engines and more particularly to improvements in the parts and components of valve operating means, an important object being to carry out the operation of valves by a novel arrangement of cooperating parts and elements.

In approaching the problems relating to valve operation in engines, due consideration must be given to the effect of temperature changes upon the means and mechanism provided for operating the valve, to the effect of wear and deterioration of the operating parts of such a mechanism in relation to the hammering and shock effects of rapid changes of direction which take place, and to a number of other and closely related problems having to do with the form and construction of the elements and parts employed in the complete mechanism or necessarily required to be included to comprise a complete operating assembly.

As a general proposition, engine valve actuating mechanisms are arranged to provide a certain small amount of clearance at the valve whereby a complete valve closure may be attained with positive effect. In prior constructions the amount of clearance provided is usually a compromise proposition, based on engine conditions when cold and when heated during normal operation. The rise of temperature in the engine parts adjacent the combustion chamber is, of course, productive of the greatest amount of expansion in such parts, whereas the parts spaced from the combustion chamber are not subject to as great a temperature rise and do not expand in direct proportion. This disproportionate expansion between parts close to and spaced from the zone of greatest temperature rise produces an undesirable increase in the amount of valve clearance, particularly in the engines of the valve-in-head types, when the engine is hot over that existing when the engine is cold. In consequence of this increasing clearance between the parts of a cold and a hot engine, the valve operating mechanism is subjected to an increased rate of wear due to the higher velocities at which it operates when contacting the valve. Further, the mechanism is, at engine operating temperature, required to move through a relatively greater distance before valve contact is attained, thereby producing a valve hammering effect with resultant shock in the system. This hammering and shock is most noticeable in valve-in-head engines, and it accelerates wear and mechanical deterioration and eventually throws the valve timing out of proper relation for best engine operation.

Accordingly, it is a further broad and important object of the present invention to provide operating means for engine valves which will improve upon and offer a ready solution for the above noted objections.

More specifically, the present improvements are directed to valve operating means which will effectively minimize to an important degree the herein mentioned undesirable increase of clearance at the valve, by the combination of parts in a valve operating mechanism having a coefficient of expansion which is greater than, preferably of the order of substantial one and one-half times that of the parts directly and closely responsive to the rise in temperature occurring in the combustion zone of the engine, it being fully possible to obtain, in this manner, a reasonable and fairly uniform equalization of operating clearance regardless of whether the engine is cold or at operating temperature.

A further object of the present invention is found in the combination and arrangement of parts of a valve operating mechanism such as will effect a reduction in the hammering and shock effects on the mechanism incident to operation of a valve, and will reduce the rate of wear and deterioration of the parts thereof, the improvements embodying mechanism having an effective movement greater than that of the valve and in which a relatively flexible shock absorbing element is incorporated.

Still another object of the invention resides in foregoing arrangement of valve operating means and in the further combination of a plurality of resilient or spring elements, one adapted solely for closing the valve and another adapted solely for maintaining a load on the operating means in the direction necessary for its constant response to the actuating impulses of the cam element, such that the forces in the system may be apportioned to best advantage.

A further object of the invention resides in the provision of cam actuated mechanism for operating a valve wherein the mechanism is adapted to effect an optimum valve lift and permit the use of a cam of a size which will enable the minimization of error being introduced during manufacture.

Figure 2:
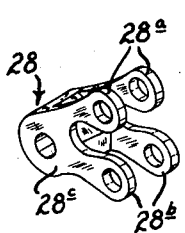

Other objects and advantages will appear from the following detailed description of one preferred construction which is disclosed in the accompanying drawing, and wherein:

Fig. 1 is an elevational view of the presently preferred valve operating means and mechanism as the same would be applied to an internal combustion engine, and wherein only so much of the engine has been indicated in sectional detail as will enable a full and complete understanding hereof; and Fig. 2 is a detailed view, in perspective, of the resilient element herein preferred for use in a valve operating system.

The preferred arrangement and structural features of the present improvements are illustrated in Fig. 1, and reference will now be made thereto. In the example, cylinder 10 carried by the frame 11 of the engine has a piston 12 movably disposed therein to define with the cylinder 10 and a cylinder head member 13 a working space 14 which, in this instance is the fuel combustion chamber. The head member 13 is formed with a passage 15 leading to a ported sleeve insert 16 which opens to the space 14 through the port 17. This port 17 is controlled by a poppet-type valve member 18 having its stem 19 extending through the sleeve insert 16 and operatively connected with one end of a valve closure spring 20, the opposite end of the spring being seated in a sleeve recess, as shown.

The means or mechanism for actuating valve 18 comprises a rocker lever 21 pivoted at 22 on the bracket 23 and provided with oppositely extending arms 24 and 25. Arm 24 carries a roller element for operative engagement with the upper end of the valve stem 19, whereas the arm 25 is pivotally connected with the pivot element 26 suitably adjustably attached to the upper end of a valve push rod or connecting link 27. This latter push rod 27 extends to a motion transmitting rocker element 28 pivotally mounted at 29 on a bracket 30, and is pivotally connected thereto by means of a pivot element 31 which is similar to the upper element 26. Rocker element 28 is actuated by a cam push rod assembly 32 which is suitably housed at the side of the frame 11 and is comprised of a fixed sleeve 33 having a guide cap 34 at its upper end for a cam push rod 35, and a slide member 36 reciprocably mounted adjacent its lower end. In the arrangement indicated, the cam push rod 35 is pivotally attached by block element 37 to the rocker element 28 and is urged in one direction by a spring 38 which bears on the rod at the shouldered element 39 and abuts the fixed guide cap 34. The lower end of cam push rod 35 bears in a cross block 40 of the slide member 36 such that reciprocatory motion of the member is directly transmitted thereto, and to the remainder of the valve push rod system. As shown, slide 36 is resiliently urged in one direction by spring 41 such that a roller follower 42 carried thereby may have an operating contact on the profile of the driving cam member 43. Since the present disclosure of Fig. 1 is illustrative of the application of the valve actuating means and mechanism to an internal combustion engine, it will be understood that the cam member 43 is affixed to a suitable engine driven camshaft 44 which, in turn, is rotated in timed relation with the motion of the piston 12.

Referring to Figs. 1 and 2, the above described system includes a novel form of rocker element 28 which is adapted to have a certain degree of flexibility or yieldability for cushioning the hammering and high shock loads of the operating mechanism. This element 28 (Fig. 2) is formed with spaced and divergent, bifurcated arms 28a and 28b which are integrally formed with the body 28c, as shown. Each of these bifurcated arms has a zone intermediate its length which is of reduced sectional area thereby providing the requisite degree of yieldability in the direction of the plane of the arms or normal to the pivot axis of the element, and such as will allow the arms to move relative to each other and to the body portion 28c. Thus with the element assembled in the system and connected as shown in Fig. 1, it will be appreciated that uniform movement of the push rod 35 will be transmitted to the push rod 27 without appreciable yielding in the arms 28a and 28b of the element 28. But upon sudden resistance to the normal conditions of its motion transmission, these arms 28a and 28b will undergo relative yielding displacement, which will result in a cushioning or damping of the shock loads in the system.

One of the features of the present valve operating mechanism, and one heretofore objectively stated, is found in the arrangement whereby the maximum lift or motion of the valve 18 is less than the motion of the operating mechanism driven by the cam 43. In an arrangement of this character, the operating mechanism exemplified by assembly 32, valve push rod 27 and the connecting parts will possess a motion transmitting mechanical advantage which is advantageous to the attainment of a smooth and positive operation of the valve 18. Moreover, the greater part or amplified motion of the operating mechanism relative to the required lift or motion of the valve enables the maintenance of a minimum clearance between the valve and operating mechanism therefor, and also permits the use of a relatively larger cam element. This latter feature is important particularly in the case of small sized engines or machines having cam actuated valves, as the accuracy of cam design and manufacture may be increased very materially with increase in the physical dimensions of the cam.

By way of example only, the valve operating mechanism shown in Fig. 1 discloses one arrangement wherein the range of motion of the push rod system is greater than that for the valve 18. In this system the vertical movement of the cam push rod 35 is effective to cause angular movement of the rocker element 28, and the selection of the points of pivotal mounting of the block elements 31 and 37 relative to the fixed pivot 29 is such that block 31 is more distant and is thus necessarily constrained to move through a longer arcuate path. Thus rocker element 28 increases or amplifies the linear movement of the valve push rod 27 relative to the cam push rod 35 in the ratio of the effective radial distances from the pivots at each block element 31 and 37 to the fixed pivot 29. The operative relation of the valve push rod 27 to the valve 18 through the rocker lever 21 is such as to reduce the resulting linear movement of the valve by the ratio of the effective radial distances each has from the fixed pivot 22 for the lever 21. It will now appear that the cooperative effect of the motion amplifying rocker element 28 and motion reducing rocker lever 21 is to enable a desirably greater linear movement for the push rod system than for the valve 18, and hence a permissible increase in the size of operating cam 43 over that normally found in prior constructions.

In combination with the valve operating system above described, it is a preference that the mechanism, particularly the push rods 27 and 35, be formed of a metal, such as steel alloys of the character of that containing eighteen percent (18%) chrome and eight percent (8%) nickel, having a coefficient of thermal expansion of the order of substantially one and one-half times that of the frame structure and contiguous parts subject to the heat of combustion. Such parts are usually formed of ordinary steel and cast iron and are represented herein as including the frame 11, cylinder 10, head 13 and the contiguous superstructure usually mounted thereon. This higher coefficient of thermal expansion in the push rods compensates for the lesser rise in temperature of such parts, as the engine warms up and attains normal operating temperatures and, as a result, equalizes the proper and predetermined valve clearance regardless of engine temperature variations.

Having now described one preferred example of the present invention in connection with its use and application in the internal combustion engine art, it will be pertinent and reasonable to regard all changes, modifications, rearrangements and the like which are brought to light after understanding the foregoing disclosure as coming within the spirit and scope of the appended claims.

I claim:

1. A rocker for actuating a valve push rod comprising a body portion having means for pivotal attachment to a support, and a pair of resilient angularly spaced arms extending radially outwardly from said body portion, and having a section of reduced area permitting flexing of the arm, each arm further having means for pivotally mounting the push rod.

2. Valve operating means for an internal combustion engine providing a cylinder frame and a cylinder port-control valve, said means comprising a first rocker engageable by abutment with the cylinder port-control valve for actuation thereof, a support on the cylinder frame, a second rocker mounted on said support and having relatively angularly spaced arms, a push rod slidably mounted in said support and pivotally connected with one of the arms of said second rocker, an engine-driven cam in abutting engagement with said push rod, and a connecting link extending between said rockers, said link having one end pivotally connected to said first rocker and its opposite end pivotally connected to the other arm on said second rocker, said arms of said second rocker being sufficiently rigid for positively transmitting the movement of said push rod to said connecting link immediately upon movement of the push rod by said cam, said arms further having sections of reduced area intermediate the ends of the arms permitting flexing of the same in response to sudden shocks in the valve operating system occurring in cam actuation thereof and upon abutment of said first rocker with said valve.

CLARENCE H. SCHOWALTER.

REFERENCES CITED

The following references are of record in the file of this patent:

UNITED STATES PATENTS

| Number | Name | Date |
|---|---|---|
| 1,287,252 | Dart | Dec. 10, 1918 |
| 1,314,648 | Holmes | Sept. 2, 1919 |
| 1,451,648 | Church | Apr. 10, 1923 |
| 1,621,326 | Lawrence | Mar. 15, 1927 |
| 1,705,803 | Brush et al. | Mar. 19, 1929 |
| 2,263,034 | Fiedler | Nov. 18, 1941 |
| 2,338,726 | Leake | Jan. 11, 1944 |
| 2,371,036 | Elwert | Mar. 6, 1945 |
| 2,411,775 | Bronander | Nov. 26, 1946 |

FOREIGN PATENTS

| Number | Country | Date |
|---|---|---|
| 611,328 | France | Sept. 25, 1926 |
| 325,337 | Great Britain | Feb. 20, 1930 |